Nov. 12, 1963    R. W. SMITH    3,110,830
ROTOR BRAKE
Filed April 16, 1962

INVENTOR.
ROBERT W. SMITH
BY Shrady & Shrady
HIS ATTORNEYS.

United States Patent Office 3,110,830
Patented Nov. 12, 1963

3,110,830
ROTOR BRAKE
Robert W. Smith, Janesville, Wis., assignor to Electro Counter & Motor Corp., Chicago, Ill., a corporation of Illinois
Filed Apr. 16, 1962, Ser. No. 187,564
7 Claims. (Cl. 310—77)

My invention relates to a new and useful improvement in a rotor brake and has as an object the provision in a device of this character of an improved construction hereinafter described which will be highly efficient in use and economical in manufacture.

A principal object of my invention is in the provision in a device of this character of an arrangement of parts for braking the rotation of a rotor of an electric motor.

A further object of my invention is in the provision in a brake of this character that is automatically effective to brake the rotation of the rotor upon being de-energized.

Yet another object of my invention is in the provision in a device of this character of a means whereby the braking action may be pre-set to a degree corresponding to the determinable rotational force of inertia of the rotor or the apparatus to which it may be operatively connected.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2, 3, 4:
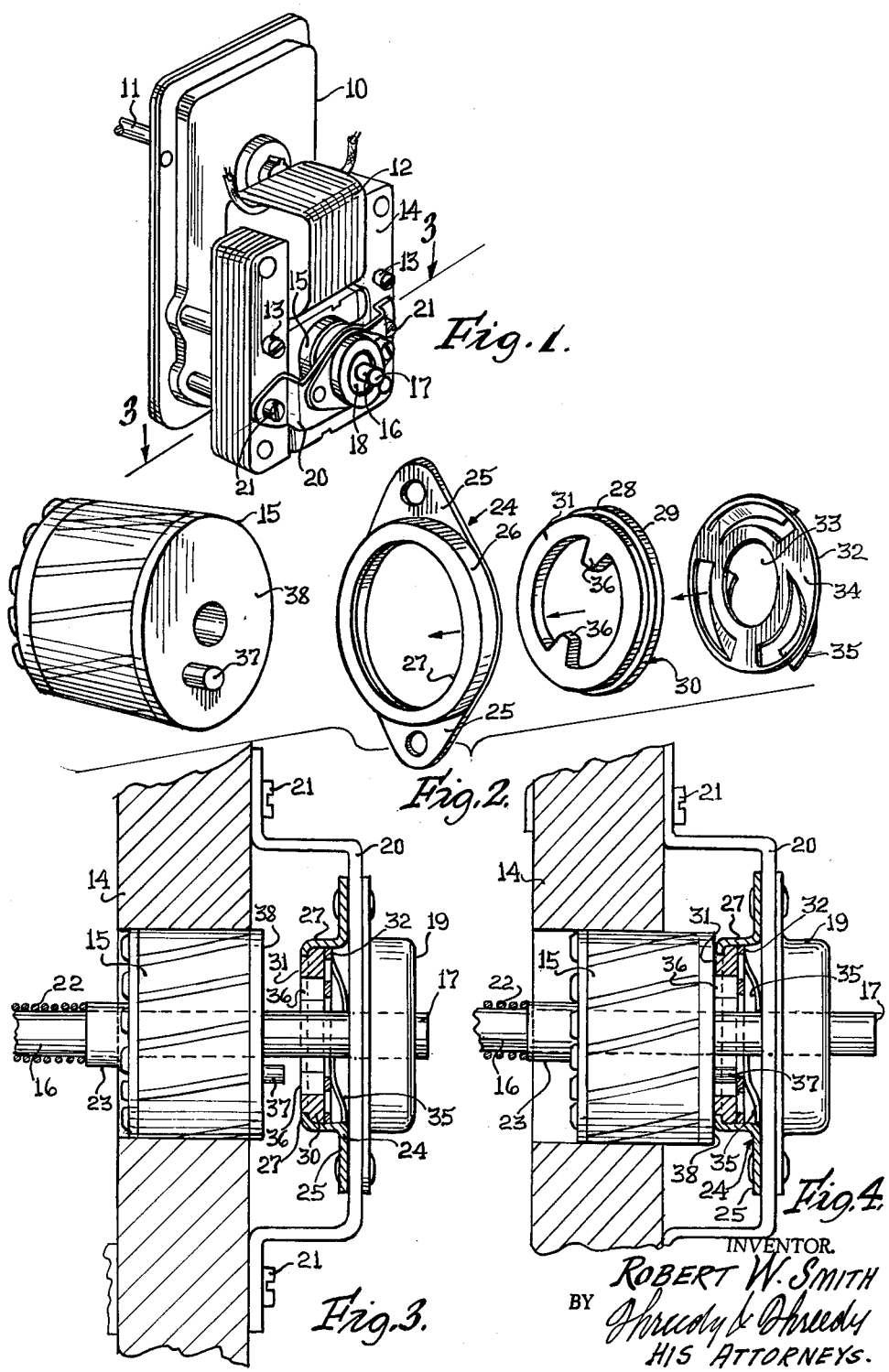
FIG. 1 is a perspective view of an electric motor and gear housing which may be associated with my invention.
FIG. 2 is an exploded view of the associated parts of my rotor brake.
FIG. 3 is a fragmentary detailed sectional view taken on line 3—3 of FIG. 1, showing the parts thereof in a non-braking relation.
FIG. 4 is a fragmentary detailed sectional view similar to FIG. 3 but showing the parts thereof in a braking position.

Referring to FIG. 1, I disclose a hollow housing 10 which encases a train of gears, not shown, but the construction of which is well known in the art and which construction and operation make up no part of the present invention. A driven shaft 11 extends laterally from one side of the housing 10 adjacent one end thereof. An electric motor 12 is mounted by means of screws 13 or the like to a housing 10 on the opposite side and adjacent the opposite end of the housing with respect to the driven shaft 11.

The electric motor 12 comprises a stator 14 and a squirrel-cage type rotor 15. The rotor 15 is mounted on a driving shaft 16, which has one end extending into the housing 10 where it terminates into a spur pinion (not shown) which provides a gear connection to the train of gears contained within such housing. The opposite end 17 of the shaft 16 is rotatably journaled in a suitable bearing 18 carried by a bearing housing 19 which is connected by a bracket 20 to the stator 14 by means of screws 21 or the like as seen in FIGS. 1, 3, and 4. The shaft 16 is of a sufficient length so as to permit the spur pinion end thereof to remain in driving connection with the train of gears in the housing during the limited axial movement of the shaft 16 relative to the stator 14.

The shaft 16 together with the rotor 15 is movable laterally in one direction with respect to the stator 14 by any suitable means such as a spring 22 coiled about the shaft 16 and arranged between a bushing 23 carried by the shaft 16 adjacent the rotor 15, and the housing 10. This lateral movement of the shaft 16 and rotor 15 may be achieved through any suitable mechanical method such as through the use of the leaf spring bearing on one free end of the shaft 16 or the like, the construction and operation of which is all well known in the art.

Carried by the bracket 20 on one side thereof opposite to the bearing housing 19 is a brake container 24. This container 24 is provided with an eliptical mounting flange 25 adapted to lie in facial abutment with one side of the mounting bracket 20 as seen in FIGS. 3 and 4, and a circular boss 26 positioned in axial alignment with the bearing housing 19. This circular boss 26 provides an inwardly extending lip 27 which is adapted to sit upon a circular base 28 provided by the enlarged ring-like base member 29 of a brake disc 30. The brake disc 30 is adapted to sit within the confines of a circular boss 26 with a raised face portion 31 thereof lying in the facial plane of the lip 27 as seen in FIGS. 3 and 4. The circular boss 26 of the container 24 is of a depth to receive not only the disc 30, but also a spring plate 32. This spring plate 32 provides a central opening 33 through which projects the shaft 16. Between the central opening 33 and the peripheral edge of the plate 32 the plate provides a medial portion 34 which has struck therefrom a plurality of spring fingers 35 in a manner that such spring fingers 35 extend in a spiral direction.

The brake disc 30 provides a plurality of braking elements 36 which extend radially inwardly from the flange 31 thereof as viewed in FIG. 2. The rotor 15 is provided with a braking pin 37 which protrudes laterally from one side wall 38 of the rotor shaft in a spaced parallel direction with respect to the shaft 16 upon which the rotor 15 is carried.

When the electric motor 12 is inactive and de-energized the heretofore described parts of my rotor shaft brake mechanism will be in the position shown in FIGS. 1 and 4. Upon energization of the electric motor 12, the stator 14 will have a solenoidal effect on the rotor 15 and cause the same, together with the shaft 16, to move axially within the full magnetic field of the stator 14 and drive the train of gears in a manner to effect rotation of the driven shaft 11. This solenoidal action is well known in the art, and may also be effected by mechanical means such as achieved through the employment of a helical pinion.

It is the purpose of this invention to immediately arrest the rotational force of the rotor 15 and its shaft 16 upon the de-energization of the electric motor 12. To accomplish this end, it should be noted that when the electric motor 12 is de-energized the magnetic field of the stator 14 is interrupted and the rotor 15 and shaft 16 are laterally displaced by the spring 22 so that the pin 37 carried by the face 38 of the rotor 15 moves within the confines of the disc 30 and as it is continuing to rotate about a horizontal axis by reason of its own inertia, such pin 37 will engage one of the braking elements 36 and be immediately arrested. The braking disc 30 is restrained against free limited rotation by the frictional pressure placed thereon through the spring plate 32. The degree of frictional pressure upon the disc 30 is determined by the amount of angular displacement of the spring fingers 35 with respect to the spring plate 32.

As seen in FIGS. 3 and 4, the spring fingers 35 bear against the inner wall of the brake 20 and exert an axial pressure on the disc 30 against the lip 27 of the circular boss 26 provided by the container 24.

The frictional pressure of the disc 30 against the lip 27 provided by the circular boss 26 determines the degree of braking force which the disc 30, through either of its braking elements 36, will exert against the rotational force of the pin 37 of the rotor 15, when the electric motor 12 is de-energized. This degree of frictional force should be such that during the initial contact of the pin 37 against one of the braking elements 36, the disc 30 will be permitted to slip in the direction of such rotational force. This arrangement of parts is extremely beneficial when upon energization of the motor 12 the initial movement of the rotor 15 is both rotational and axially with respect to the stator 14. Thus the initial movement is permitted by the slipping of the disc 30 within the circular boss 26 provided by the container 24. Such an arrangement also permits operation of the device under low voltage.

The permitted slippage of the disc 30 through the rotational force of the pin 37 of the rotor 15 is actually of minute importance upon the driven shaft 11 as the train of gears normally provide a differential ratio of such shaft 11 with respect to the shaft 16.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A brake for stopping the rotor of an electric motor comprising
    (a) a shaft for supporting the rotor of the electric motor for rotational and axial movement relative thereto,
    (b) a braking member carried by the motor and in the path of axial movement of said rotor rotatably carried by said shaft,
    (c) cooperative braking elements on said rotor and said braking member,
    (d) means for moving said rotor and said shaft axially relative to the motor and its cooperative braking element into braking engagement with the cooperative braking element of said braking member when the motor is de-energized.
    (e) a yieldable pressure plate carried by said braking member and frictionally engaging one of the cooperative braking elements for adjusting the braking pressure of said one of said cooperative braking elements upon the other of said braking elements to restrain rotation of said rotor and said shaft due to their own inertia when said cooperative braking elements are in braking engagement.

2. In a motor including a stator and rotor,
    (a) a shaft for supporting said rotor relative to said stator for rotational and axial movement relative thereto,
    (b) means for axially moving said shaft and rotor in one direction relative to said stator,
    (c) a bearing housing for supporting one end of said shaft with the opposite end thereof in driving engagement with a train of gears adapted to rotate a driven shaft,
    (d) a braking mechanism carried by said bearing housing,
    (e) means on said rotor for engaging said braking mechanism when said rotor is moved axially relative to said stator by said moving means so as to restrain rotatable movement of said shaft when said stator is de-energized,
    (f) said braking mechanism comprising a braking member freely embracing said shaft and disposed in a parallel facial relation with respect to said rotor, and
    (g) a yieldable pressure plate carried by said braking mechanism and frictionally engaging said braking member for adjusting the braking pressure of said brake member axially of said shaft.

3. In a motor including a stator and rotor,
    (a) a shaft for supporting said rotor relative to said stator for rotational and axial movement relative thereto,
    (b) means for axially moving said shaft and rotor in one direction relative to said stator,
    (c) a bearing housing for supporting one end of said shaft with the opposite end thereof in driving engagement with a train of gears adapted to rotate a driven shaft,
    (d) a braking mechanism carried by said bearing housing,
    (e) a brake pin laterally extending from one face of said rotor parallel to said shaft and in the direction of said braking mechanism so as to engage the same when said rotor and said shaft is moved axially in one direction by said moving means upon de-energization of said stator,
    (f) said braking mechanism comprising a braking member freely embracing said shaft and disposed in a parallel facial relation with respect to said rotor,
    (g) a yieldable pressure plate carried by said braking mechanism and frictionally engaging said braking member for adjusting the braking pressure of said brake member axially of said shaft.

4. In a motor including a stator and rotor,
    (a) a shaft for supporting said rotor relative to said stator for rotational and axial movement relative thereto,
    (b) a spring member for axially moving said shaft and rotor in one direction relative to said stator,
    (c) a bearing housing for supporting one end of said shaft with the opposite end thereof in driving engagement with a train of gears adapted to rotate a driven shaft,
    (d) a braking mechanism carried by said bearing housing,
    (e) means on said rotor for engaging said braking mechanism when said rotor is moved axially relative to said stator by said spring member so as to restrain rotatable movement of said shaft when said stator is de-energized,
    (f) said breaking mechanism comprising a braking member freely embracing said shaft and disposed in a parallel facial relation with respect to said rotor, and
    (g) a yieldable pressure plate carried by said braking mechanism and frictionally engaging said braking member for adjusting the braking pressure of said brake member axially of said shaft.

5. In a motor including a stator and rotor,
    (a) a shaft for supporting said rotor relative to said stator for rotational and axial movement relative thereto,
    (b) a spring member for axially moving said shaft and rotor in one direction relative to said stator,
    (c) a bearing housing for supporting one end of said shaft with the opposite end thereof in driving engagement with a train of gears adapted to rotate a driven shaft,
    (d) a braking mechanism carried by said bearing housing,
    (e) a brake pin laterally extending from one face of said rotor parallel to said shaft and in the direction of said braking mechanism so as to engage the same when said rotor and said shaft is moved axially in one direction by said spring member upon de-energization of said stator,
    (f) said braking mechanism comprising a braking member freely embracing said shaft and disposed in a parallel facial relation with respect to said rotor,
    (g) a yieldable pressure plate carried by said braking mechanism and frictionally engaging said braking member for adjusting the braking pressure of said brake member axially of said shaft.

6. In a motor including a stator and rotor,
(a) a shaft for supporting said rotor relative to said stator for rotational and axial movement relative thereto,
(b) a spring member for axially moving said shaft and rotor in one direction relative to said stator,
(c) a bearing housing for supporting one end of said shaft with the opposite end thereof in driving engagement with a train of gears adapted to rotate a driven shaft,
(d) a braking mechanism carried by said bearing housing,
(e) a brake pin laterally extending from one face of said rotor parallel to said shaft and in the direction of said braking mechanism so as to engage the same when said rotor and said shaft is moved axially in one direction by said spring member upon de-energization of said stator,
(f) said braking mechanism comprising a braking member freely embracing said shaft and disposed in a parallel facial relation with respect to said rotor, and
(g) a yieldable pressure plate carried by said braking mechanism and frictionally engaging said braking member for adjusting the braking pressure of said brake member axially of said shaft,
(h) said braking member comprising a ring-like brake disc carried by said braking mechanism and freely embracing said shaft,
(i) said ring-like disc provided with a plurality of brake elements extending radially inwardly of the ring-like disc in the direction of said shaft, and in the rotational path of said brake pin when said rotor is moved axially with respect to said stator.

7. In a motor including a stator and rotor,
(a) a shaft for supporting said rotor relative to said stator for rotational and axial movement relative thereto,
(b) a spring member for axially moving said shaft and rotor in one direction relative to said stator,
(c) a bearing housing for supporting one end of said shaft with the opposite end thereof in driving engagement with a train of gears adapted to rotate a driven shaft,
(d) a braking mechanism carried by said bearing housing,
(e) means on said rotor for engaging said braking mechanism when said rotor is moved axially relative to said stator by said spring member so as to restrain rotatable movement of said shaft when said stator is de-energized,
(f) said braking mechanism comprising a braking member freely embracing said shaft and disposed in a parallel facial relation with respect to said rotor, and
(g) a yieldable pressure plate carried by said braking mechanism and frictionally engaging said braking member for adjusting the braking pressure of said brake member axially of said shaft,
(h) said braking member comprising a ring-like brake disc carried by said braking mechanism and freely embracing said shaft,
(i) said ring-like disc provided with a plurality of brake elements extending radially inwardly of the ring-like disc in the direction of said shaft.

References Cited in the file of this patent

UNITED STATES PATENTS

| | | |
|---|---|---|
| 2,462,017 | Willits | Feb. 15, 1949 |
| 2,685,043 | Durant | July 27, 1954 |